United States Patent
Nemoto

(10) Patent No.: US 7,311,300 B2
(45) Date of Patent: Dec. 25, 2007

(54) ACTUATOR DRIVE CONTROL DEVICE FOR ACTIVE VIBRATION ISOLATION SUPPORT SYSTEM, AND METHOD OF USING THE SAME

(75) Inventor: Hirotomi Nemoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 11 days.

(21) Appl. No.: 10/862,883

(22) Filed: Jun. 7, 2004

(65) Prior Publication Data

US 2005/0006830 A1   Jan. 13, 2005

(30) Foreign Application Priority Data

Jun. 10, 2003   (JP) ............... 2003-165538

(51) Int. Cl.
*F16F 5/00*   (2006.01)
(52) U.S. Cl. ............... 267/140.14; 267/140.15
(58) Field of Classification Search ........... 267/140.11, 267/140.14, 140.15; 188/378
See application file for complete search history.

(56) References Cited

U.S. PATENT DOCUMENTS

| | | | | |
|---|---|---|---|---|
| 4,371,824 | A * | 2/1983 | Gritter | 318/722 |
| 5,537,967 | A * | 7/1996 | Tashiro et al. | 123/192.1 |
| 6,018,689 | A * | 1/2000 | Kumura et al. | 700/280 |
| 6,256,545 | B1 * | 7/2001 | Kimura et al. | 700/28 |
| 6,445,149 | B1 * | 9/2002 | Muramatsu et al. | 318/114 |
| 6,536,751 | B2 * | 3/2003 | Miyoshi et al. | 267/140.14 |
| 6,631,895 | B2 * | 10/2003 | Nemoto | 267/140.14 |
| 6,641,120 | B2 * | 11/2003 | Nemoto | 267/140.14 |
| 6,743,233 | B1 * | 6/2004 | Baldwin et al. | 606/73 |
| 7,021,611 | B2 * | 4/2006 | Nemoto | 267/140.14 |
| 2002/0079631 | A1 | 6/2002 | Nemoto | |

FOREIGN PATENT DOCUMENTS

| | | |
|---|---|---|
| JP | 07-042783 | 2/1995 |
| JP | 2004-36754 | 2/2004 |

\* cited by examiner

*Primary Examiner*—Bradley King
(74) *Attorney, Agent, or Firm*—Carrier, Blackman & Associates, P.C.; Joseph P. Carrier; William D. Blackman

(57) ABSTRACT

An actuator of an active engine vibration isolation support system is driven based on the first, second, third . . . duty groups calculated corresponding to the vibration periods t1, t2, t3 . . . of the engine. When the engine rotational speed varies in the increasing direction and the vibration periods t1, t2, t3 . . . become gradually shorter, parts of the first, second, third . . . duty groups overlap each other, and therefore an electrical current which is supplied to the actuator does not become 0 at the end of the duty groups, leading to a possibility that a peak value of the electrical current gradually increases so that not only the active vibration isolation support system cannot exhibit an effective vibration isolation function, but also the actuator generates heat. Therefore, for example, when the overlapping amount of the first and the second duty groups exceeds a threshold value, a duty ratio of the second duty group is made 0 to stop application of the electrical current to the actuator. Thus, the vibration isolation function of the active vibration isolation support system is prevented from being impaired by the variation in the frequency of the input vibration.

10 Claims, 9 Drawing Sheets

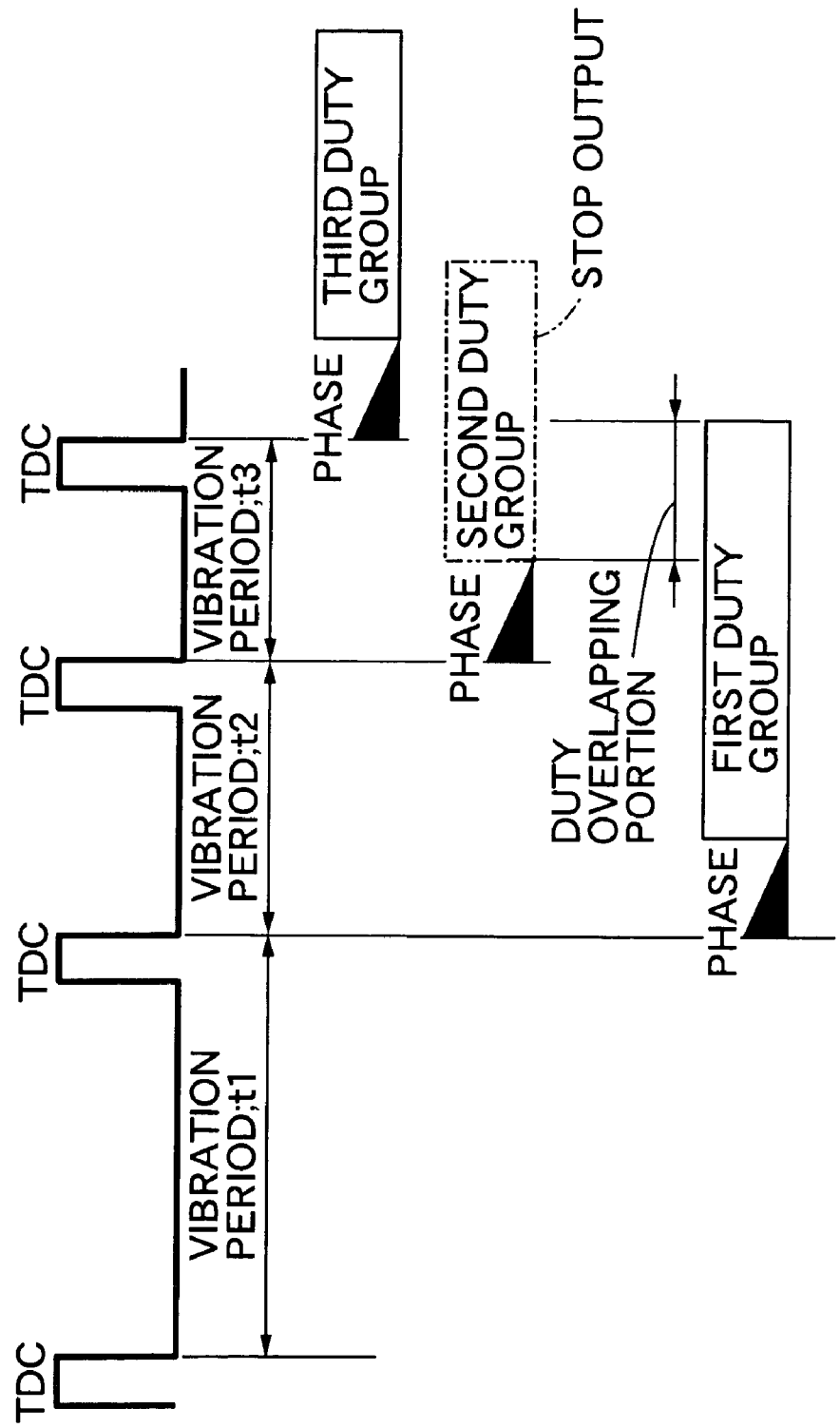

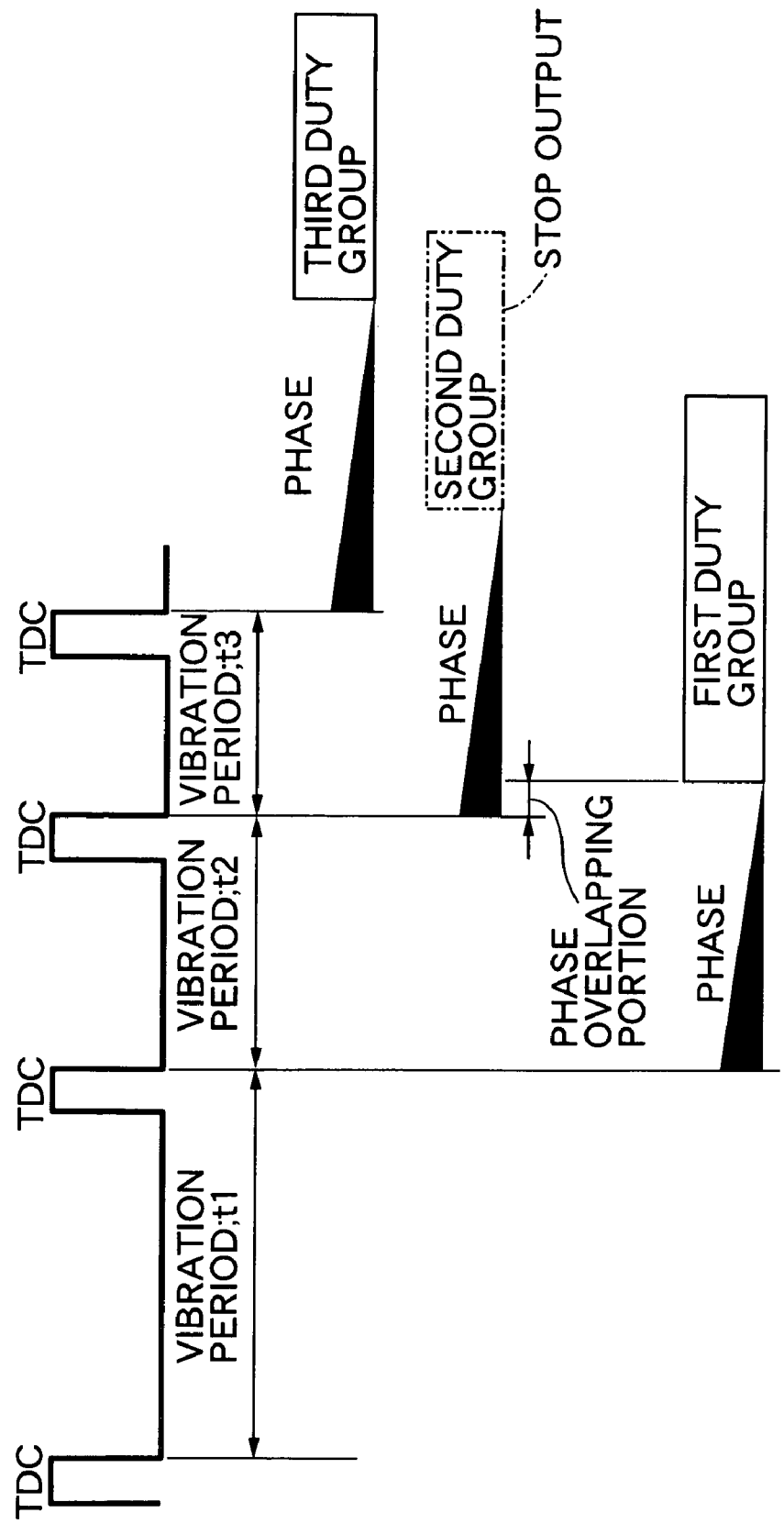

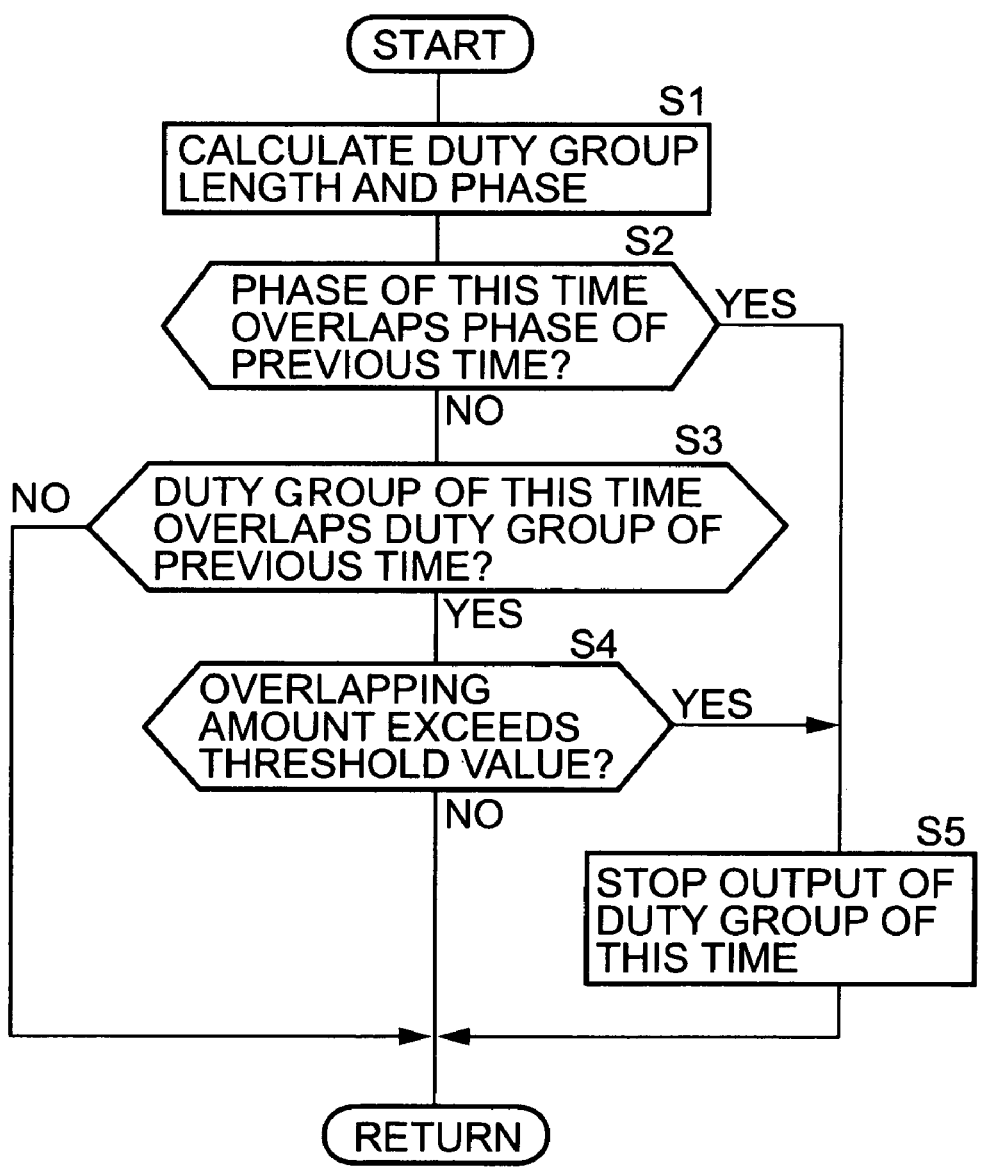

ACTUATOR DRIVE CONTROL DEVICE FOR ACTIVE VIBRATION ISOLATION SUPPORT SYSTEM, AND METHOD OF USING THE SAME

BACKGROUND OF THE INVENTION

1. Field of the Invention

The present invention relates to an actuator drive control device for an active vibration isolation support system, including an elastic body receiving a load of a vibrating body, a liquid chamber in which the elastic body forms at least a part of a wall surface, a movable member changing a capacity of the liquid chamber by reciprocating periodically, and an actuator operating periodically by receiving supply of an electrical current corresponding to a vibration state of the vibrating body.

2. Description of the Related Art

Such an active vibration isolation support system is known from Japanese Patent Application Laid-open No. 7-42783.

This active vibration isolation support system changes a spring constant by applying electrical current to an actuator so as to vibrate a movable member. The relationship between the phase and peak electrical current value of the applied electrical current that sets the spring constant is stored as a map in advance, and the phase and the peak electrical current value of the electrical current to be applied to the actuator are obtained from the map according to the rotational speed of the engine, thereby allowing the active vibration isolation support system to exhibit an effective vibration isolation function in various regions of the rotational speed of the engine.

The inventor has already proposed, in Japanese Patent Application No. 2002-194507, the active vibration isolation support system which gradually decreases a duty ratio of the electrical current which is applied to the actuator from 100% to 0% in a duty group corresponding to one period of vibration, thereby controlling a lift amount of the movable member to be a sine wave form close to a vibration waveform of the engine.

In the active vibration isolation support system that is proposed in the above-described Japanese Patent Application No. 2002-194507, a terminal end portion of a duty group and a start end portion of the next duty group sometimes overlap each other when an engine rotational speed changes in the increasing direction, as will be described in detail below in an embodiment of the present invention. When the two adjacent duty groups overlap each other, the electrical current value supplied to the actuator rises abnormally, leading to problems that the active vibration isolation support system cannot exhibit an effective vibration isolation function and generates noise and the coil of the actuator abnormally generates heat.

The present invention has been achieved in view of the aforementioned circumstances, and an object of the present invention is to prevent impairment of the vibration isolation function of the active vibration isolation support system due to variation in the frequency of an input vibration.

SUMMARY OF THE INVENTION

In order to achieve the above-described object, according to a first feature of the present invention, there is provided an actuator drive control device for an active vibration isolation support system, comprising an elastic body receiving a load of a vibrating body, a liquid chamber in which the elastic body forms at least a part of a wall surface, a movable member for changing a capacity of the liquid chamber by reciprocating periodically, and an actuator operating periodically by receiving supply of an electrical current corresponding to a vibration state of the vibrating body, the electrical current being supplied to the actuator to move the movable member in one direction, and with a restoring force of the elastic body deformed, the movable member is moved back in the other direction, wherein when an electrical current of a present period rises before an electrical current value of a previous period which is supplied to the actuator becomes 0, the electrical current value of the present period is decreased.

With the first feature, when the electrical current of the present period rises before the electrical current value of the previous period which is supplied to the actuator becomes 0, the electrical current value of the present period is decreased. Therefore, the abnormal operation and heat generation of the active vibration isolation support system due to an excessive rise in the electrical current value can be suppressed, thus securing the vibration isolation effect.

In addition to the first feature, according to a second feature of the present invention, supply of the electrical current of the present period is stopped.

With the second feature, the electrical current value is decreased by stopping the supply of the electrical current of the present period, and therefore the control of the actuator can be simplified while preventing the abnormal operation of the active vibration isolation support system.

In addition to the first feature, according to a third feature of the present invention, a duty ratio of the electrical current of the present period is decreased.

With the third feature, the electrical current value is decreased by decreasing the duty ratio of the electrical current of the present period. Therefore, the reduction in the vibration isolation function can be minimized while preventing the abnormal operation of the active vibration isolation support system.

An engine E of the embodiment corresponds to the vibrating body of the present invention, a first elastic body 14 of the embodiment corresponds to the elastic body of the present invention, and a first liquid chamber 24 of the embodiment corresponds to the liquid chamber of the present invention.

BRIEF DESCRIPTION OF THE DRAWINGS

FIG. 7 is a diagram explaining an operation when the duty groups overlap each other.

FIG. 8 is a diagram explaining an operation when phases overlap each other.

FIG. 9 is a flow chart explaining an operation of the present embodiment of the invention.

DESCRIPTION OF THE PRESENT EMBODIMENT

Figure 1:
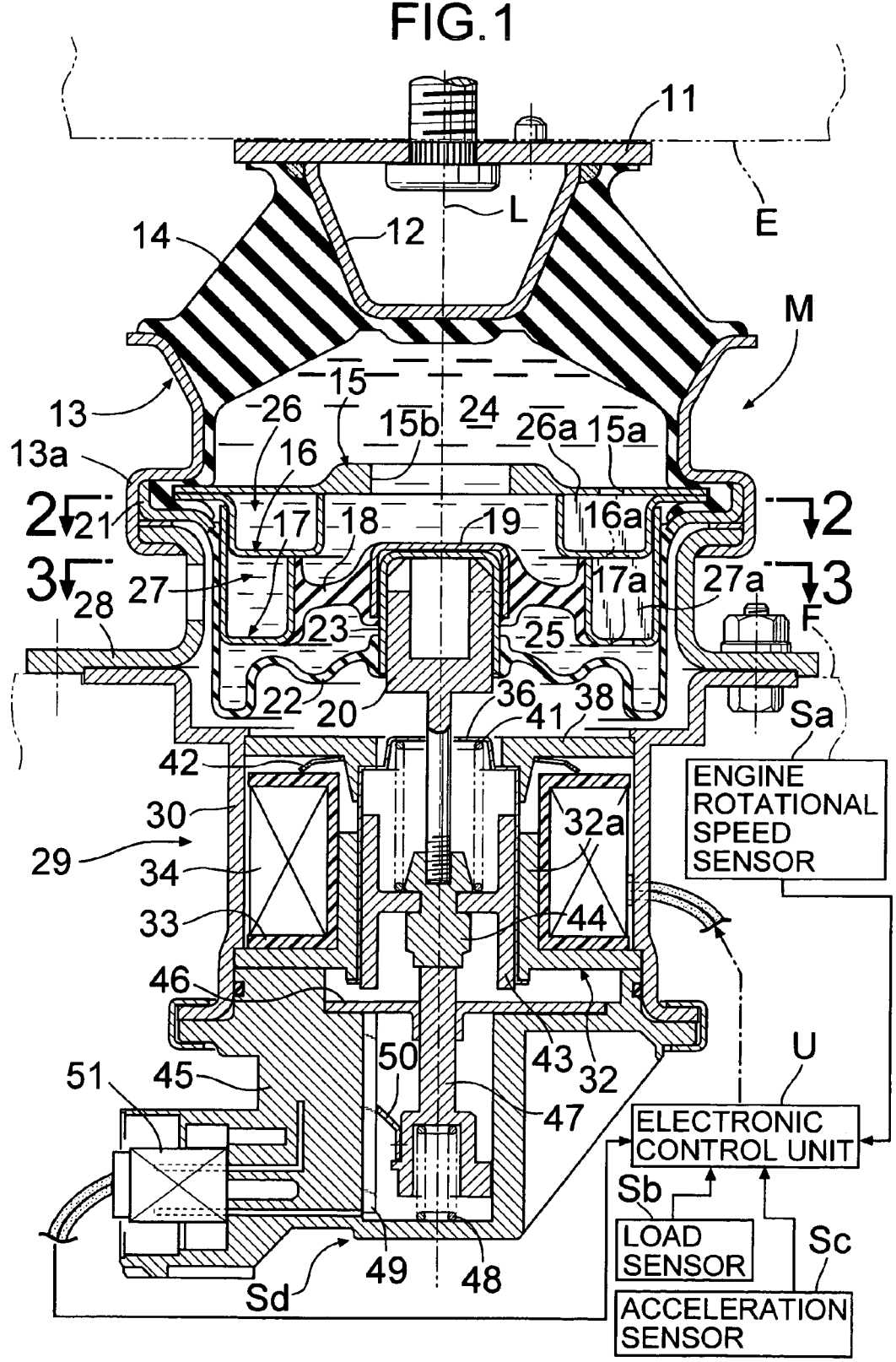
FIG. 1 is a vertical sectional view of an active vibration isolation support system.
Figure 2:
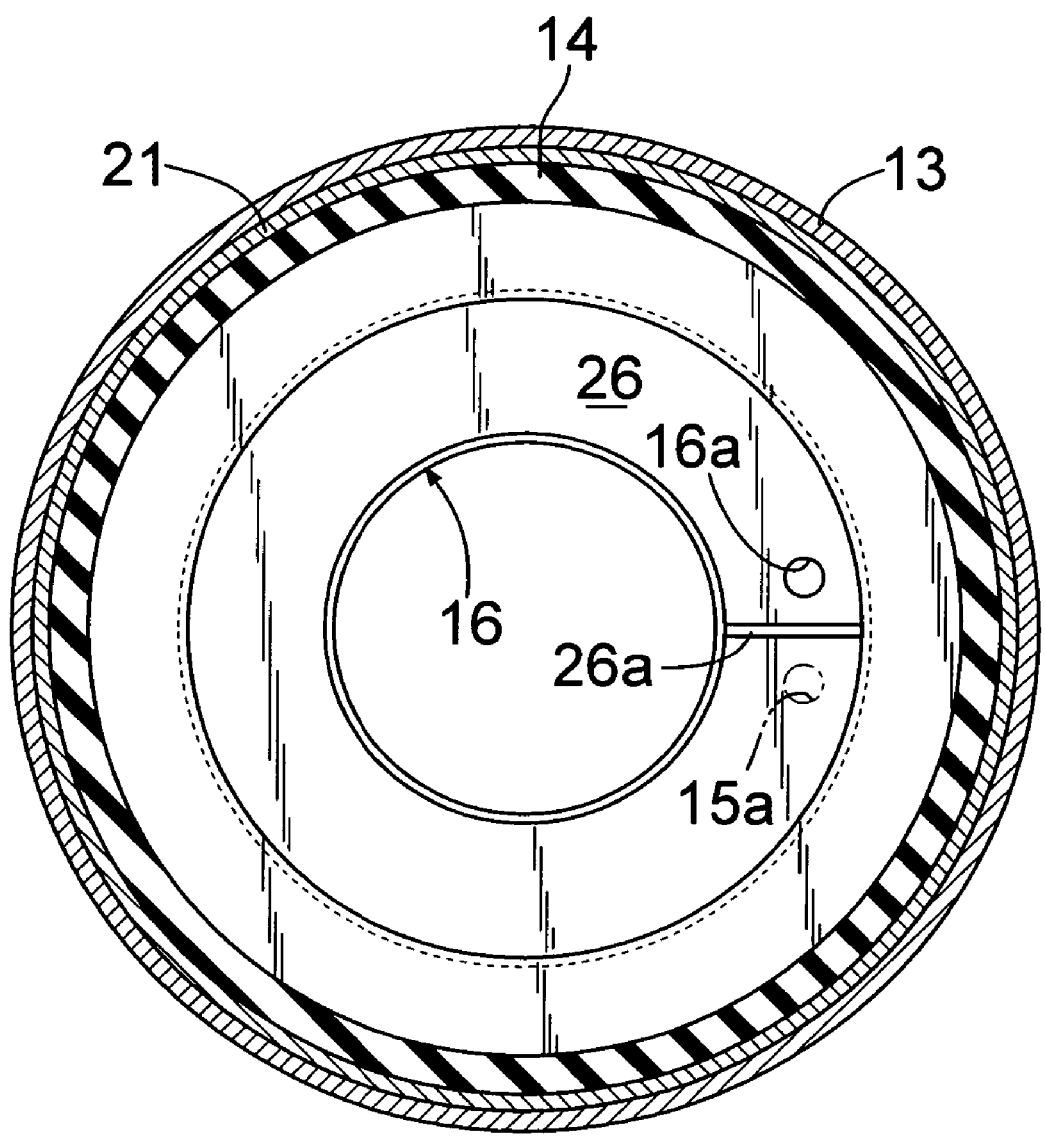
FIG. 2 is a sectional view taken along the line 2-2 in FIG. 1.
Figure 3:
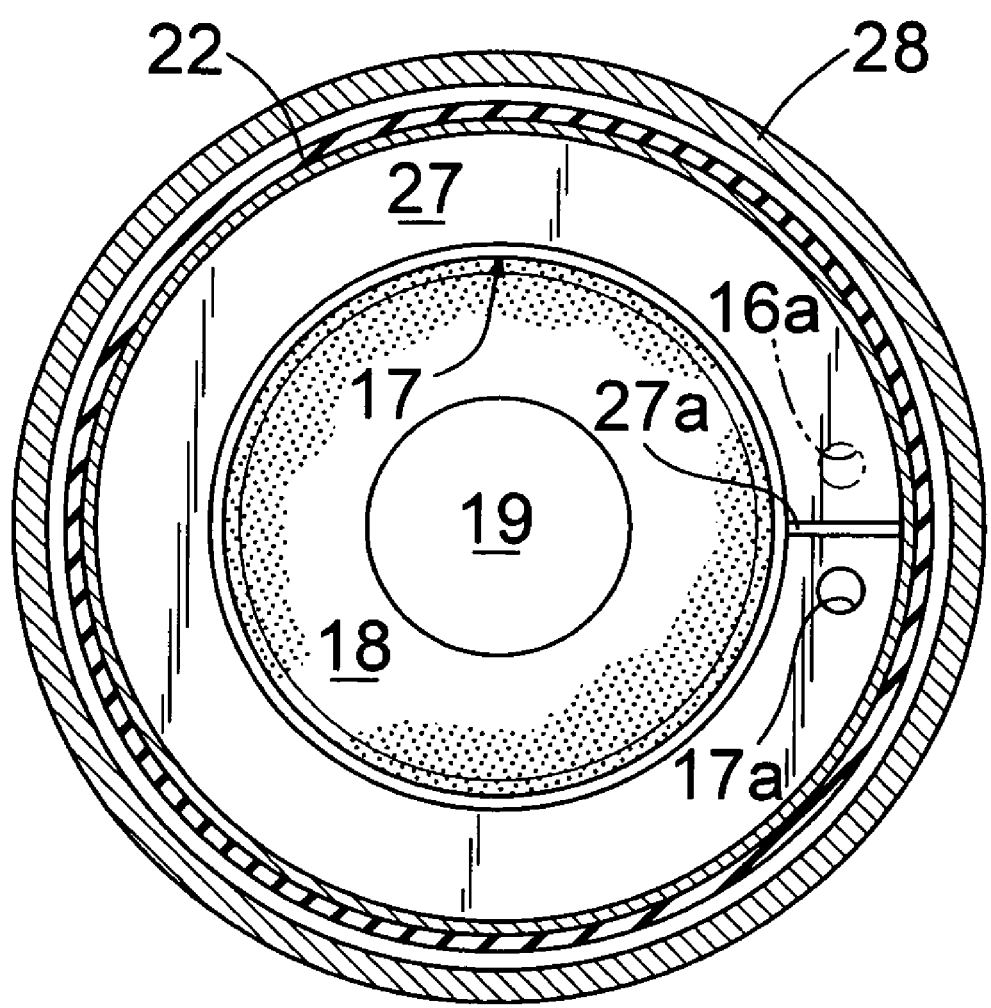
FIG. 3 is a sectional view taken along the line 3-3 in FIG. 1.
Figure 4:
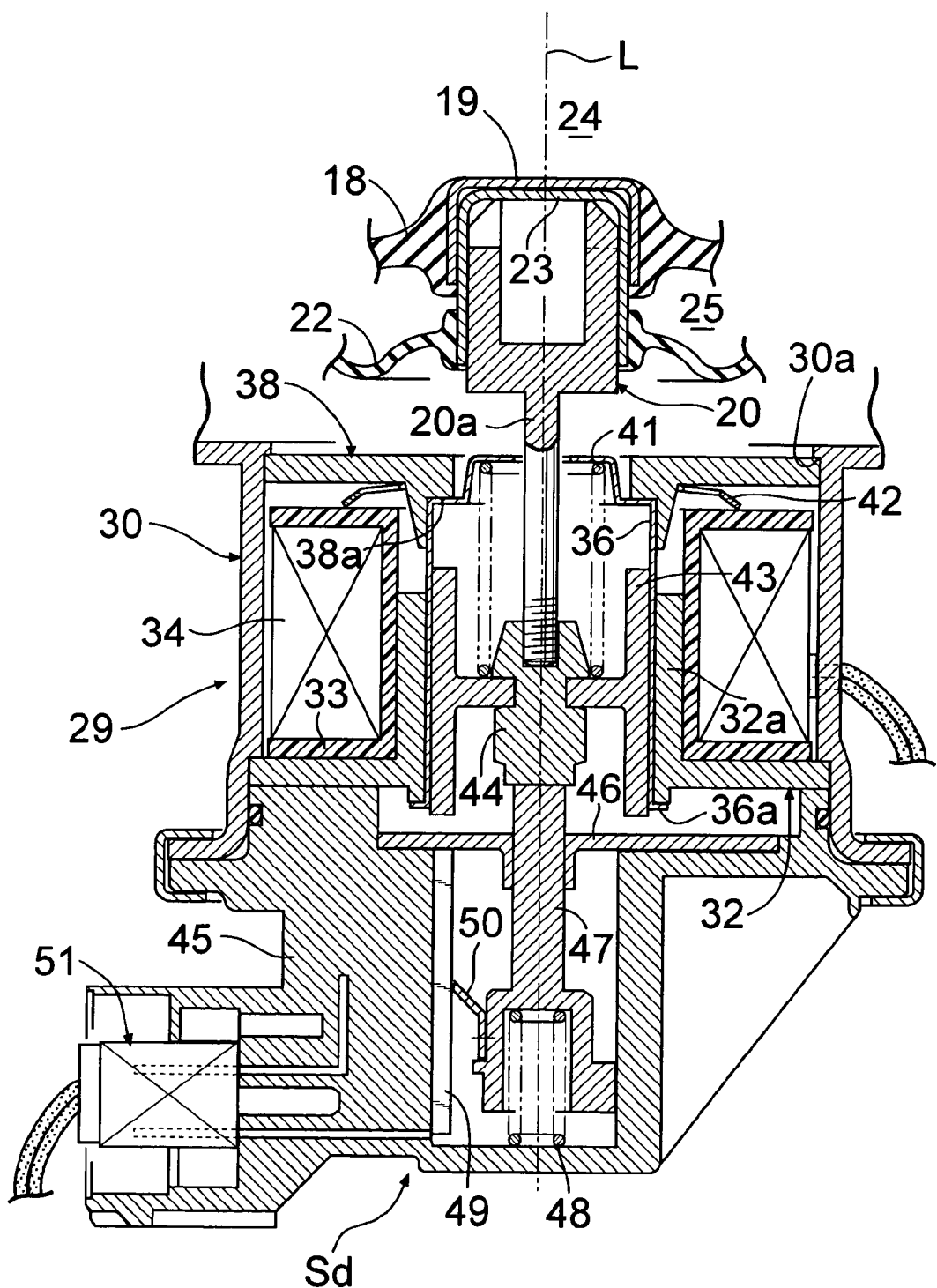
FIG. 4 is an enlarged view of an essential part of FIG. 1.

One embodiment of the present invention will be described with reference to the accompanying drawings.

An active vibration isolation support system M shown in FIG. 1 to FIG. 4 elastically supports an engine E of an automobile on a vehicle body frame F, and is controlled by an electronic control unit U, which is configured to control supply of the electrical current to the actuator, to which an engine rotational speed sensor Sa for detecting a rotational speed of the engine E, a load sensor Sb for detecting a load which is inputted into the active vibration isolation support system M, an acceleration sensor Sc for detecting acceleration acting on the engine E, and a lift amount sensor Sd for detecting a lift amount of a movable member 20 of an actuator 29 that will be described later.

The active vibration isolation support system M has a structure that is substantially symmetrical with respect to an axis L. The system M includes an inner tube 12 that is welded to a plate-shaped mounting bracket 11 that is joined to the engine E, and an outer tube 13 that is placed coaxially on an outer periphery of the inner tube 12. The inner tube 12 and the outer tube 13 are bonded by vulcanization bonding to an upper end and a lower end of a first elastic body 14 made of thick rubber, respectively. A disc-shaped first orifice-forming member 15 having an aperture 15b in its center, an annular second orifice-forming member 16 having a dipper-shaped section open at the top, and an annular third orifice-forming member 17 similarly having a dipper-shaped section open at the top are welded into a single unit. The outer peripheries of the first orifice-forming member 15 and the second orifice-forming member 16 are superimposed and fixed to a crimping fixing part 13a provided in a lower part of the outer tube 13.

The outer periphery of a second elastic body 18 made of a rubber membrane is fixed by vulcanization bonding to the inner periphery of the third orifice-forming member 17. A cap member 19 fixed by vulcanization bonding to the inner periphery of the second elastic body 18 is fixed by press fitting onto a movable member 20 disposed on the axis L to be vertically movable. The outer periphery of a diaphragm 22 is fixed by vulcanization bonding to a ring member 21 that is fixed to the crimping fixing part 13a of the outer tube 13. A cap member 23 fixed by vulcanization bonding to the inner periphery of the diaphragm 22 is fixed onto the movable member 20 by press fitting.

A first liquid chamber 24, which is charged with a liquid, is thus defined between the first elastic body 14 and the second elastic body 18, and a second liquid chamber 25, which is charged with a liquid, is thus defined between the second elastic body 18 and the diaphragm 22. The first liquid chamber 24 and the second liquid chamber 25 communicate with each other via an upper orifice 26 and a lower orifice 27 which are formed by the first to third orifice-forming members 15, 16 and 17.

The upper orifice 26 is an annular passage formed between the first orifice-forming member 15 and the second orifice-forming member 16. A communicating hole 15a is formed in the first orifice-forming member 15 on one side of a partition wall 26a provided in a part of the upper orifice 26, and a communicating hole 16a is formed in the second orifice-forming member 16 on the other side of the partition wall 26a. Therefore, the upper orifice 26 is formed over substantially one round from the communicating hole 15a of the first orifice-forming member 15 to the communicating hole 16a of the second orifice-forming member 16 (see FIG. 2).

A lower orifice 27 is an annular passage formed between the second orifice-forming member 16 and the third orifice-forming member 17. The communicating hole 16a is formed in the second orifice-forming member 16 on one side of a partition wall 27a provided in a part of the lower orifice 27, and a communicating hole 17a is formed in the third orifice-forming member 17 on the other side of the partition wall 27a. Therefore, the lower orifice 27 is formed over substantially one round from the communicating hole 16a of the second orifice-forming member 16 to the communicating hole 17a of the third orifice-forming member 17 (see FIG. 3).

As a result of the above description, the first liquid chamber 24 and the second liquid chamber 25 communicate with each other via the upper orifice 26 and the lower orifice 27 which are connected to each other in series.

An annular mounting bracket 28 for fixing the active vibration isolation support system M to the vehicle body frame F is fixed to the crimping fixing part 13a of the outer tube 13, and an actuator housing 30 constructing an outer shell of an actuator 29 for driving the aforesaid movable member 20 is welded to a lower surface of the mounting bracket 28.

A yoke 32 is fixed to the actuator housing 30, and a coil 34 wound around a bobbin 33 is housed in a space surrounded by the actuator housing 30 and the yoke 32. A bottomed cylindrical bearing 36 is inserted from below into a cylindrical part 32a of the yoke 32 fitted in an inner periphery of the annular coil 34, and is positioned by engagement between a retaining part 36a at a lower end of the bearing 36 and a lower end of the yoke 32. A disc-shaped armature 38 facing an upper surface of the coil 34 is slidably supported on an inner peripheral surface of the actuator housing 30. A step part 38a formed on an inner periphery of the armature 38 engages with an upper part of the bearing 36. The armature 38 is biased upward by a disc spring 42 that is disposed between the armature 38 and an upper surface of the coil 34, and is positioned by engagement with a retaining part 30a provided on the actuator housing 30.

A cylindrical slider 43 is slidably fitted in the inner periphery of the bearing 36, and a shaft part 20a extending downward from the movable member 20 loosely penetrates through an upper base part of the bearing 36 to be connected to a boss 44 that is fixed to an interior of the slider 43. A coil spring 41 is disposed between the upper base part of the bearing 36 and the slider 41. The bearing 36 is biased upward by this coil spring 41, and the slider 43 is biased downward by the coil spring 41.

The lift amount sensor Sd provided at a lower part of the actuator 29 includes a sensor housing 45 fixed to a lower end of the actuator housing 30. A sensor rod 47 is slidably supported by a guide member 46 fixed to an inside of the sensor housing 45, and is biased upward by a coil spring 48 provided between the sensor rod 47 and a bottom portion of the sensor housing 45 to abut to a boss 44 of the slider 43. A contact point 50 fixed to the sensor rod 47 contacts a resistor 49 fixed to the inside of the sensor housing 45. An electric resistance value between a lower end of the resistor 49 and the contact point 50 is inputted into the electronic control unit U via a connector 51. The lift amount of the movable member 20 is equal to a moving amount of the contact point 50, and therefore the lift amount of the movable member 20 can be detected based on the electric resistance value.

When the coil 34 of the actuator 29 is in a demagnetized state, an elastic force of the coil spring 41 acts downward on the slider 43 slidably supported in the bearing 36, and an elastic force of the coil spring 48 acts upward via the sensor rod 47 and the boss 44, so that the slider 43 stops at a position where the elastic forces of both the coil springs 41 and 48 are in balance. When the coil 34 is excited in this state so as to draw the armature 38 downward, the step part 38a pushes the bearing 36 to slide it downward, thereby compressing the coil spring 41. As a result, the elastic force of the coil spring 41 increases, thereby lowering the slider 43, the movable member 20 that is connected to the slider 43 via the boss 44 and the shaft part 20a descends, and the second elastic body 18 connected to the movable member 20 deforms downward, thus increasing the capacity of the first liquid chamber 24. Conversely, when the coil 34 is demagnetized, the movable member 20 rises, the second elastic body 18 deforms upward, and the capacity of the first liquid chamber 24 decreases.

When a low-frequency engine-shake vibration occurs while the automobile is traveling, if a load inputted from the engine E deforms the first elastic body 14, thus changing the capacity of the first liquid chamber 24, the liquid travels between the first liquid chamber 24 and the second liquid chamber 25, which are connected via the upper orifice 26 and the lower orifice 27. When the capacity of the first liquid chamber 24 increases and decreases, the capacity of the second liquid chamber 25 decreases and increases accordingly, and this change in the capacity of the second liquid chamber 25 is absorbed by the elastic deformation of the diaphragm 22. Since the shapes and dimensions of the upper orifice 26 and the lower orifice 27 and the spring constant of the first elastic body 14 are set so that a high spring constant and a high attenuation force can be obtained in a region of the frequency of engine shake vibration, the vibration that is transmitted from the engine E to the vehicle body frame F can be reduced effectively.

In this frequency region of the engine shake vibration, the actuator 29 is maintained in a non-operational state.

If vibration having a frequency higher than that of the engine shake vibration, namely, idling vibration or muffled sound vibration due to the rotation a crankshaft of the engine E occurs, the liquid within the upper orifice 26 and the lower orifice 27 which connect the first liquid chamber 24 and the second liquid chamber 25 is brought into a fixed state and cannot exhibit the vibration isolation function, and therefore the actuator 29 is operated so as to exhibit the vibration isolation function.

The electronic control unit U controls application of an electric current to the coil 34 of the actuator 29 based on the signals from the engine rotational speed sensor Sa, the load sensor Sb, the acceleration sensor Sc and the lift amount sensor Sd. More specifically, when the engine E is biased downward by a vibration to decrease the capacity of the first liquid chamber 24 and thereby the liquid pressure is increased, the coil 34 is excited to draw the armature 38 downward. As a result, the armature 38 moves downward with the movable member 20 while compressing the coil spring 41, and deforms downward the second elastic body 18 of which inner periphery is connected to the movable member 20. Therefore, the capacity of the first liquid chamber 24 is increased to suppress an increase in the liquid pressure, and therefore the active vibration isolation support system M generates an active supporting force for preventing transmission of a downward load from the engine E to the vehicle frame F.

On the other hand, when the engine E is biased upward by the vibration to increase the capacity of the first liquid chamber 24 and thereby the liquid pressure is decreased, the coil 34 is demagnetized to release attraction of the armature 38. As a result, the armature 38 is moved upward with the movable member 20 by the elastic force of the coil spring 41, and thereby deforms upward the second elastic body 18 of which inner periphery is connected to the movable member 20. As a result, the capacity of the first liquid chamber 24 is reduced to suppress a decrease in the liquid pressure, and therefore the active vibration isolation support system M generates an active supporting force for preventing transmission of the upward load from the engine E to the vehicle body frame F.

A target lift amount of the movable member 20 which the electronic control unit U calculates based on the outputs of the engine rotational speed sensor Sa, the load sensor Sb and the acceleration sensor Sc is compared with an actual lift amount detected with the lift amount sensor Sd, and feedback control of the operation of the actuator 29 is performed so that the difference between the target lift amount and the actual lift amount reduces to 0.

Figure 5:
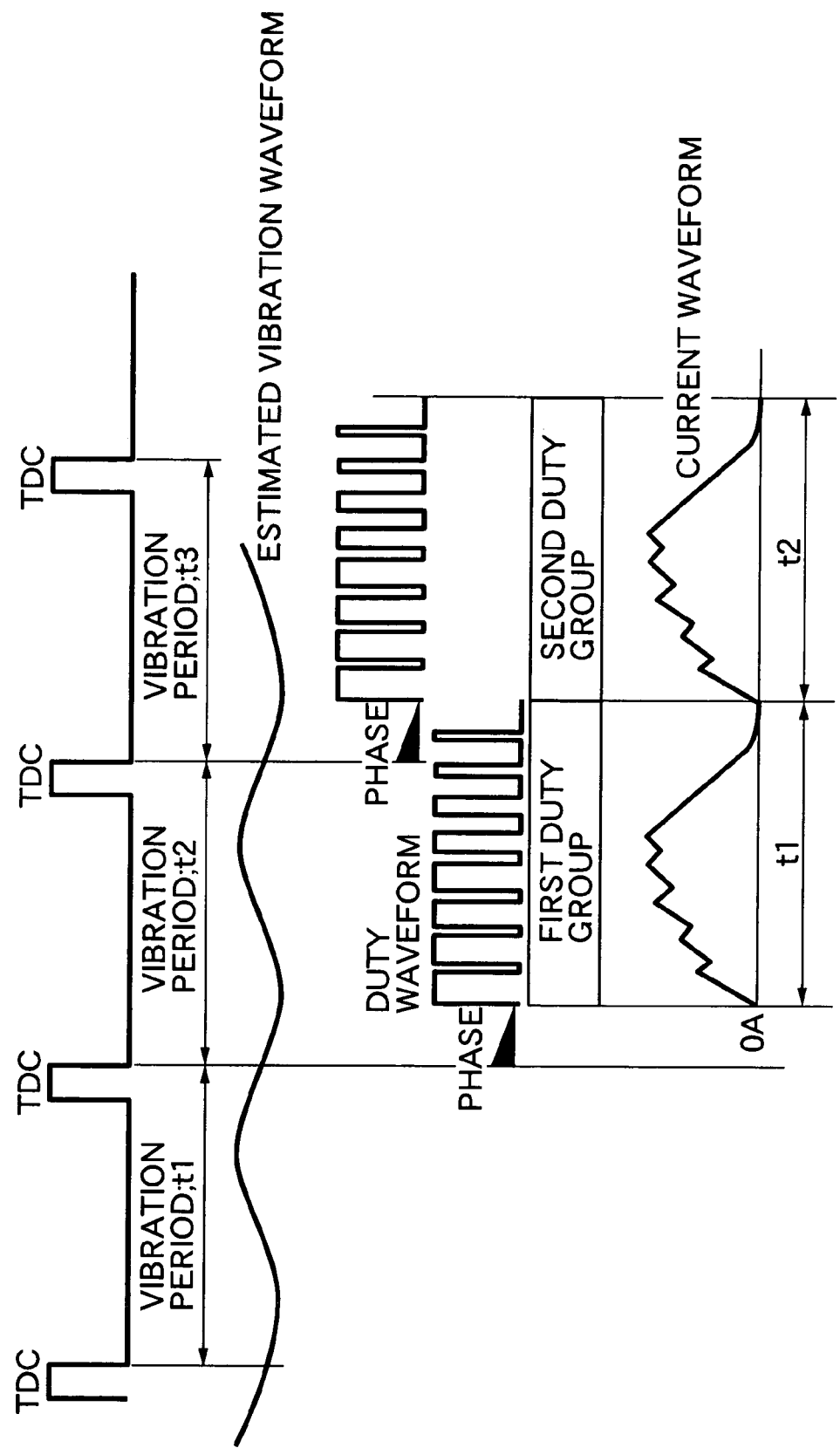
FIG. 5 is a diagram showing duty groups when an engine rotational speed is stable.

As shown in FIG. 5, when the target lift amount of the actuator 29 is a sine wave form of a predetermined period, a number of consecutive very small time ranges are set in the one period, and a duty control of an electrical current which is supplied to the actuator 29 in each of the very small time ranges is performed to give the target lift amount to the movable member 20. A group of very small time ranges in one period is called a duty group. In the duty group of this embodiment, eight very small time ranges are combined to constitute one period of the lift amount of the actuator 29.

The lift amount of the actuator 29 can be controlled to be a sine wave form by gradually decreasing from 100% the duty ratio of the eight very small time ranges of the duty group. If the number of consecutive very small time ranges with the change in the duty ratio constituting a constant pattern is increased or decreased, the period of the lift amount can be increased or decreased. Also, the waveform of the lift amount of the actuator 29 can be optionally controlled by changing the duty ratio of the duty group in various patterns.

The example in FIG. 5 shows the case in which the engine rotational speed is stable, and vibration periods t1, t2, t3 . . . , which are time intervals between TDC signals of the respective cylinders detected by the engine rotational sensor Sa, become constant. The duty ratio of the duty group in the next vibration period t2 is determined based on the target lift amount of the movable member 20 which is calculated based on the outputs of the engine rotational sensor Sa, the load sensor Sb and the acceleration sensor Sc during the vibration period t1. In this case, the phase that is the timing of the start point of the duty group is also determined together with the duty ratio. This phase is an estimated lowermost portion of the vibration waveform of the engine E, namely, the timing at which the engine E begins to be biased downward due to vibration. By applying an electrical current to the actuator 29 in this timing, the active vibration isolation support system M can exhibit the vibration isolation function.

Figure 6:
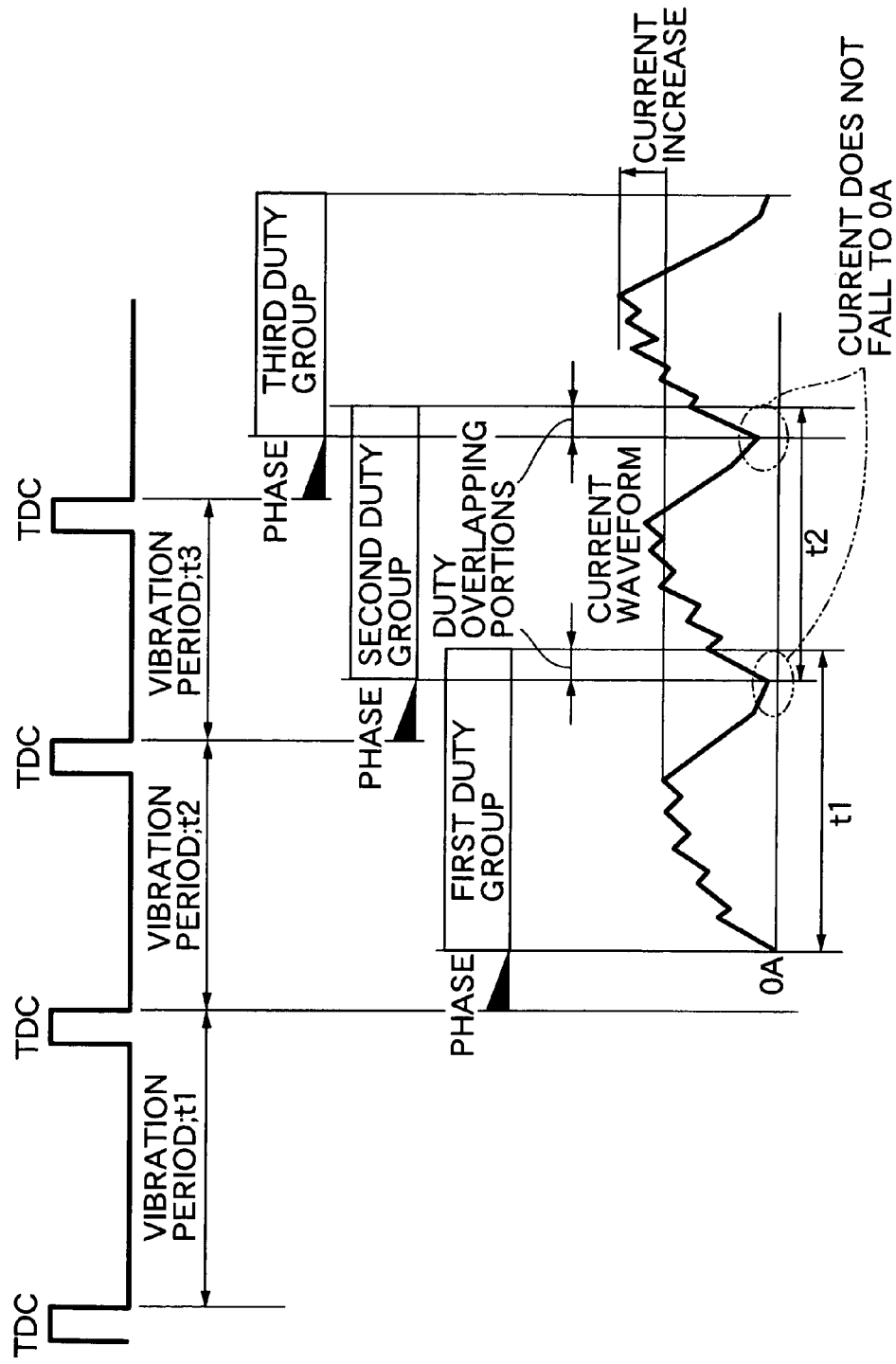
FIG. 6 is a diagram showing the duty groups when the engine rotational speed increases.

However, as shown in FIG. 6, when the engine rotational speed varies in the increasing direction, the vibration periods t1, t2, t3 . . . gradually become shorter. In this case, the length of the first, second, third . . . duty groups which is the same length as the vibration periods t1, t2, t3 . . . also gradually becomes shorter, but the first, second, third . . . duty groups have a delay of one period with respect to the vibration periods t1, t2, t3, and therefore the first, second, third . . . duty groups overlap each other at one part. As a result, the electrical current value supplied to the actuator does not become 0 at the end of the first, second, third . . . duty groups, and the peak value of the electrical current gradually increases, leading to a possibility that the active vibration isolation support system M cannot exhibit the effective vibration isolation function and makes noise, and the coil 34 of the actuator 29 generates heat.

Therefore, in this embodiment, the overlapping amounts of the first, second, third . . . duty groups are monitored as shown in FIG. 7, and when the overlapping amount exceeds a threshold value, the duty ratio of the next duty group is made 0 and application of an electrical current to the actuator 29 is stopped. In the example in FIG. 7, the terminal portion of the first duty group and the initial portion of the second duty group overlap each other by more than the threshold value, and therefore the duty ratio of the second duty group is set at 0. As a result, the terminal portion of the second duty group and the initial portion of the third duty group do not overlap each other, and therefore the electrical current is supplied to the third duty group as it is. In other words, when the duty group of a present period overlaps the duty group of a previous period such that a threshold value is exceeded, the duty ratio of the present duty group is made 0.

As shown in FIG. 8, when the phases corresponding to the vibration periods t1, t2, t3 . . . overlap each other, it is estimated that the terminal portion of the duty group at the front side and the initial portion of the duty group at the rear side overlap each other by more than the threshold value, and therefore the duty ratio of the next duty group is made 0 to stop application of an electrical current to the actuator 29. In the example in FIG. 8, the phase corresponding to the vibration period t1 overlaps the phase corresponding to the next vibration period t2, and therefore the duty ratio of the duty group corresponding to the vibration period t2 is set at 0. When the duty ratio of the duty group corresponding to the vibration period t2 is thus set at 0, the electrical current for the duty group corresponding to the vibration period t3 is supplied as it is even if the phase corresponding to the vibration period t2 overlaps the phase corresponding to the next vibration period t3.

As described above, when the electrical current of the present period rises before the electrical current of the previous period which is supplied to the actuator 29 becomes 0, supply of the electrical current of the present period is stopped, and therefore the active vibration isolation support system M is prevented from operating abnormally as a result that the electrical current value which is supplied to the actuator 29 excessively increases, thus preventing the coil 34 of the actuator 29 from abnormally generating heat while securing the maximum vibration isolation function.

Next, the above-described operation will be further explained based on the flow chart in FIG. 9.

First, the length (vibration period of the engine E) and the phase of the duty group are calculated in step S1. When the phase of this time overlaps the phase of the previous time in the subsequent step S2, the output of the duty group following the phase of this time is stopped in step S5 (see FIG. 8). When the phase of this time does not overlap the phase of the previous time in the aforesaid step S2, and when the duty group of this time overlaps the duty group of the previous time in step S3 and the overlapping amount exceeds the threshold value in step S4, the output of the duty group of this time is stopped in the step S5 (see FIG. 9).

An embodiment of the present invention has been described in detail above, but the present invention can be modified in a variety of ways without departing from the subject matter of the invention.

For example, when the duty groups or the phases overlap, the output of the duty group is stopped in the embodiment, but the duty ratio may be decreased with a predetermined ratio (for example, 80%). If the output of the duty group is simply stopped, the control of the actuator 29 is simplified, but the vibration isolation function of the active vibration isolation support system M is reduced more or less. On the other hand, when the duty ratio is decreased at the predetermined ratio, the reduction in the vibration isolation function of the active vibration isolation support system M can be minimized.

The same result can be obtained by determining whether the vibration period of this time is shorter than the vibration period of the previous time by more than the threshold value or not, instead of determining whether the overlapping amount of the duty group of this time and the duty group of the previous time is more than the threshold value or not.

In the embodiment, the active vibration isolation support system M for supporting the engine E of the automobile is shown as an example, but the active vibration isolation support system of the present invention is applicable to support of other vibrating bodies such as a machine tool.

What is claimed is:

1. An actuator drive control device for an active vibration isolation support system, comprising:
    an elastic body that receives a load of a vibrating body;
    a liquid chamber in which the elastic body forms at least a part of a wall surface;
    a movable member for changing a capacity of the liquid chamber by reciprocating periodically; and
    an actuator operating periodically by receiving supply of an electrical current corresponding to a vibration state of the vibrating body;
    a controller which is configured to control supply of the electrical current to the actuator;
    the electrical current being supplied to the actuator to move the movable member in one direction, and with a restoring force of the elastic body deformed, the movable member is moved back in the other direction when the electrical current supply is stopped,
    wherein when an electrical current of a present period rises before an electrical current value of a previous period which is supplied to the actuator becomes 0, the controller decreases the electrical current value of the present period.

2. The actuator drive control device for the active vibration isolation support system according to claim 1, wherein when the electrical current of the present period rises before the electrical current value of the previous period which is supplied to the actuator becomes 0, supply of the electrical current of the present period is stopped.

3. The actuator drive control device for the active vibration isolation support system according to claim 1, wherein when the electrical current of the present period rises before the electrical current value of the previous period which is supplied to the actuator becomes 0, the controller decreases a duty ratio of the electrical current of the present period.

4. The actuator drive control device for the active vibration isolation support system according to claim 1, wherein when the electrical current of the present period rises before the electrical current value of the previous period which is supplied to the actuator becomes 0, a duty ratio of the electrical current of the present period is decreased to zero.

5. The actuator drive control device for the active vibration isolation support system according to claim 1, wherein when the electrical current of the present period rises before the electrical current value of the previous period which is supplied to the actuator becomes 0 and a duty overlapping portion between the present and previous periods exceeds a predetermined value, the controller decreases the electrical current value of the present period.

6. A method of controlling an active vibration isolation support system with an actuator drive control device, said vibration isolation support system comprising:
   an elastic body adapted to receive a load of a vibrating body;
   a liquid chamber in which the elastic body forms at least a part of a wall surface;
   a movable member for changing a capacity of the liquid chamber by periodically reciprocating; and
   an actuator for reciprocally moving said movable member;
   wherein said method comprises the steps of:
   periodically reciprocating the movable member by intermittently supplying electrical current corresponding to a vibration state of the vibrating body to said actuator;
   wherein electrical current supplied to the actuator moves the movable member in a first direction to deform said elastic body, and the movable member is moved back in the other direction when the electrical current supply is interrupted, and
   decreasing an electrical current value of a present period when the electrical current of the present period rises before an electrical current value of a previous period which is supplied to the actuator becomes 0.

7. The method of claim 6, further comprising a step of stopping the electrical current of the present period when the electrical current of the present period rises before the electrical current value of the previous period which is supplied to the actuator becomes 0.

8. The method of claim 6, further comprising a step of decreasing a duty ratio of the electrical current of the present period when the electrical current of the present period rises before the electrical current value of the previous period which is supplied to the actuator becomes 0.

9. The method of claim 6, further comprising a step of decreasing a duty ratio of the electrical current of the present period to zero when the electrical current of the present period rises before the electrical current value of the previous period which is supplied to the actuator becomes 0.

10. The method according to claim 6, wherein when the electrical current of the present period rises before the electrical current value of a previous period which is supplied to the actuator becomes 0 and a duty overlapping portion between the present and previous periods exceeds a predetermined value, the electrical current value of the present period is decreased.

* * * * *